United States Patent [19]
Dail

[11] Patent Number: 5,706,601
[45] Date of Patent: Jan. 13, 1998

[54] TRAP AND METHOD FOR TRAPPING A MOUSE OR OTHER RODENT

[76] Inventor: Robert P. Dail, P.O. Box 7, 212 Riverview Ave., Camden, N.C. 27921

[21] Appl. No.: 447,755

[22] Filed: May 23, 1995

[51] Int. Cl.⁶ .................................. A01M 23/30
[52] U.S. Cl. ............................................. 43/81
[58] Field of Search ................. 43/81, 83, 81.5, 43/82, 83.5

[56] References Cited

U.S. PATENT DOCUMENTS

| | | |
|---|---|---|
| 968,990 | 8/1910 | Schuyler . |
| 1,709,199 | 4/1929 | Thayer ........................... 43/81 |
| 2,332,334 | 10/1943 | Morrison ....................... 43/81 |
| 2,492,957 | 1/1950 | Blair . |
| 3,045,384 | 7/1962 | Gruschow et al. . |
| 3,992,803 | 11/1976 | Kaiser . |
| 4,030,230 | 6/1977 | Souza . |
| 4,127,958 | 12/1978 | Peters et al. . |
| 4,216,606 | 8/1980 | Kaiser et al. . |
| 4,703,583 | 11/1987 | Dzurkovich et al. ........... 43/81 |
| 4,825,579 | 5/1989 | Dzurkovich et al. ........... 43/82 |
| 5,148,624 | 9/1992 | Schmidt . |

*Primary Examiner*—Scott A. Smith
*Assistant Examiner*—Jay A. Stelacone
*Attorney, Agent, or Firm*—Wigman, Cohen, Leitner & Myers, P.C.

[57] ABSTRACT

A trap and method for trapping a mouse or other rodent. The present invention is directed to an animal trap, particularly to a mouse trap or the like in combination with an enclosure in the form of a plastic bag inside a cover. The enclosure is contoured so as to fit within the cover and has an open rear end to admit an entry therein of the rodent. When the rodent enters the enclosure and touches a pad end of the trigger member, the spring-loaded striker is released from a catch position and kills the rodent within the enclosure by entering the lower portion of the cover through two vertical slots without penetrating the enclosure. The enclosure is then pulled from the cover by the user and disposed of. The bag can be of the colored plastic type, so the user will not even see the mouse inside of it.

5 Claims, 3 Drawing Sheets

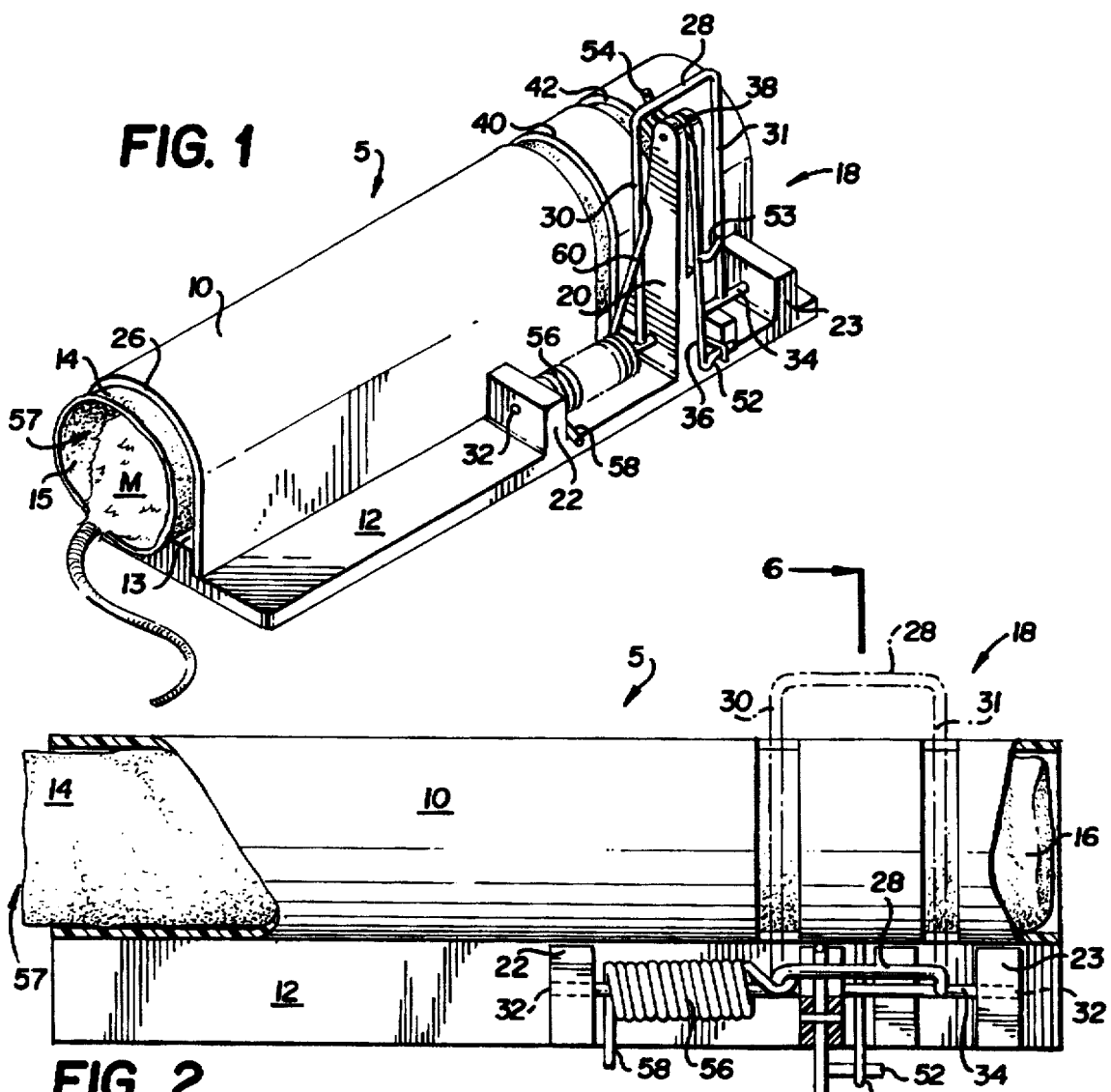
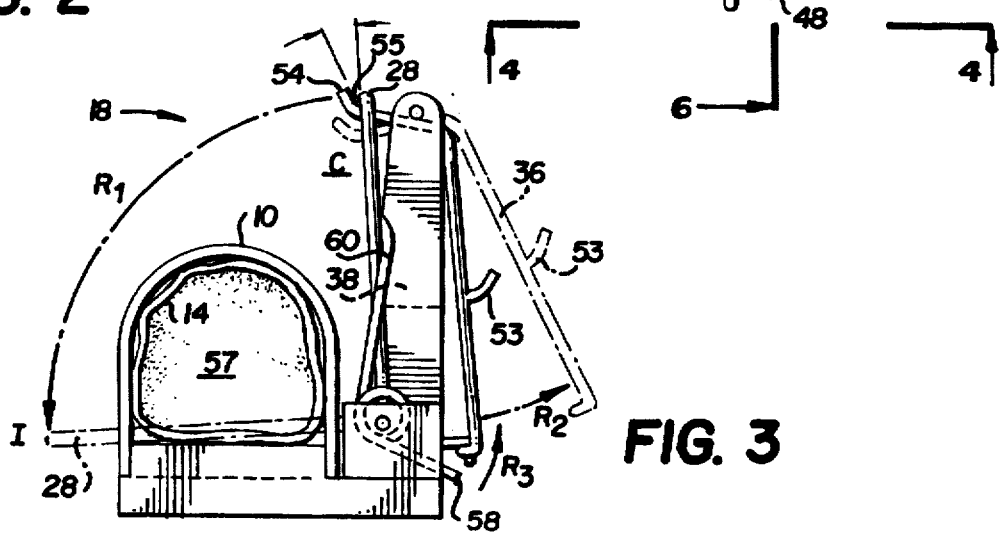

5,706,601

TRAP AND METHOD FOR TRAPPING A MOUSE OR OTHER RODENT

FIELD OF THE INVENTION

The present invention relates generally to animal traps and more particularly to a disposable mouse trap which provides for safely catching and sanitary disposal of rodents, such as household mice and rats.

BACKGROUND OF THE INVENTION

Mouse traps have been designed in many ways throughout the years. Conventionally, mouse traps include a bar that is spring-mounted to a wood base, the bar and the base forming jaws in which the bar can be moved from a cocked position to a released position when the mouse touches the trigger arm. Unfortunately, there are many disadvantages connected with this type of mouse trap. For example, there is a risk of a user hurting his fingers while trying to set the mouse trap in the cocked position.

Because of its open exposure, it is dangerous to use a spring-loaded type of trap in places where there are small children and pets. Also, there is a sanitation problem after catching the mouse, such as removing the dead mouse from the trap or disposing of the trap and the mouse as a whole. Sometimes the trap is thrown away rather than use it again. Furthermore, a trap that is used several times does tend to become messy because of the continued presence of body fluids released when the spring-loaded bar strikes the mouse. In addition, many people do not like to use a mouse trap because they are touching something that a mouse has touched.

Several disposable mouse traps have been suggested in the prior art which solved many of the above problems. For example, U.S. Pat. No. 5,148,624 to Schmidt discloses a mouse trap having an handle that is remote from the trapping mechanism so that the mouse trap may be set for use without endangering one's hands or fingers. The trap includes a cover that shields one's body from contact with the trapping mechanism and dead animal. Moreover, the mouse trap contains a jaw frame which is in perpendicular orientation relative to the base in the cocked position, so the less distance the jaw must travel before trapping an animal and thus, the less chance a rodent will have of escaping or surviving.

One typical disposable mouse trap is disclosed in U.S. Pat. No. 4,030,230 to Souza. That patent illustrates trapping means and package means. By a resilient rubber band the trap is temporarily maintained outside the container until the mouse triggers the trap and at which time the impact causes the trap and dead mouse to be withdrawn into the container, so that the user need not see or touch either item.

Other mouse traps generally of the type to which this invention relates are disclosed by the U.S. Pat. Nos. 3,992, 8093, and 4,216,608 to Kaiser; 3,045,384 to Cruschow and 2,492,957 to Blair.

SUMMARY OF THE INVENTION

The present invention is directed to mouse traps and in particular to a disposable mouse trap that has a plastic bag inside a cover. A key advantage of the present invention is the fact that the mouse is captured and killed in a bag. The bag is then pulled from the cover and disposed of. The bag can be of the colored plastic type, so that the user will not even see the mouse inside of it. The bag also limits his escape in the event the mouse becomes frightened by the sound of the trigger in that the route of escape is for the mouse to back out of the bag.

An advantage of the present invention is that the handle of the striker which a user touches when he sets the trap is never touched by the mouse. Moreover, if any body fluids are expelled from the mouse when the striker hits, such body fluids are contained in the bag. Another advantage of the invention is its ability to easily adjust or alter the space between the arms of the striker so that both arms hit the mouse instead of one, thereby reducing any chance of the trapped mouse suffering.

Yet another advantage of the present invention is that it is possible to set up the trap with the user's fingers always being behind the striker, in contrast with the traps on the market today. It helps to protect the user's fingers from injury when setting up the mouse trap. It is therefore an advantage of this invention that it obviates the need of the user to see or touch the dead mouse after the trap has been sprung.

Moreover, another advantage of the invention is to manufacture the mouse trap of plastic and metal materials which will not have absorbency and staining problems, due to the mouse body fluids, such as in the case of wood traps, thus eliminating any sanitation problems.

A method in accordance with the present invention of killing a rodent in a trap includes the steps of trapping the rodent within an enclosure and killing the rodent within the enclosure without penetrating the enclosure.

With the foregoing and other advantages and features of the invention that will become hereinafter apparent, the nature of the invention may be more clearly understood by reference to the following detailed description of the invention, the appended claims and several views illustrated in the drawings.

BRIEF DESCRIPTION OF THE DRAWINGS

FIG. 1 is a perspective view of a first embodiment of a mouse trap of the present invention;

FIG. 2 is a top plan view of the mouse trap of FIG. 1;

FIG. 3 is an end view of a striker means showing the pivotal movement of the striker means between a catch position and a release position;

DETAILED DESCRIPTION OF THE INVENTION

Figure 4:
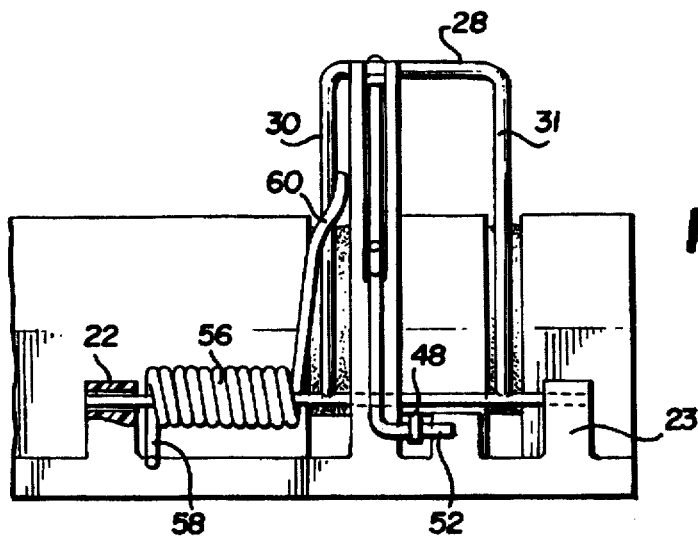
FIG. 4 is a detail view of a partial side elevation, taken along line 4—4 of FIG. 2, showing a pair of a spring extension rods.
Figure 5:
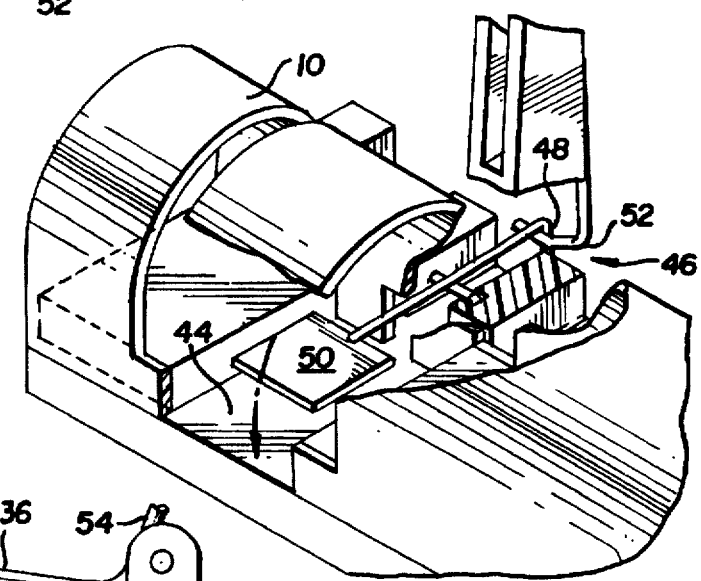
FIG. 5 is a partial fragmented perspective view of a trigger member having a rear end for cooperating with a cam lever and a pad end for contacting with a rodent.

Referring now in detail to the drawings, wherein like parts are designated by like reference numerals throughout, there is illustrated in FIGS. 1–6 an improved mouse trap in the form and shape of a cover 10 which is engaged with a plastic base 12 to define the space 13 in which a bag or enclosure 14 is inserted.

A striker means 18 for killing the rodent and enclosure 14 cooperate so as to strike the rodent within the enclosure 14 without penetrating the enclosure 14 as shown in FIG. 2.

The enclosure 14 has an open end 15 adapted so as to admit the entry therein of a rodent M and has a closed rear end 16 wherein bait can be placed. The enclosure 14 may be comprised of a colored plastic disposable bag which is inserted into the space 13 between cover 10 and base 12. Enclosure 14 is flexible, but sufficiently rigid so as to conform to space 13 to provide a passage in which the rodent enters.

The base 12 (preferably made of plastic) has an upright stand 20 and two support members 22 and 23 as shown in FIG. 1 and FIG. 2. The base 12 preferably is a rectangular in shape (see FIG. 1 and FIG. 2) and has a cavity 44 for the movement of sensing element or trigger member 46, as best viewed in FIG. 5. The trigger member 46 has a rear end 48 for cooperation with a cam lever 36 and a trigger pad 50 for contacting the rodent.

The striker means 18 is mounted to the base 12 and includes a striker bar 28 with a pair of interconnected striker arms 30 and 31.

Each of the support members 22 and 23 has a central groove 32 through which a pivot pin 34 passes, so that the striker means 18 can rapidly pivot from a catch position C to a sprung, release position T, as shown in FIG. 3.

The cover 10 is in the form of a tubular member having an inverted U-shape cross section 26 and is preferably made of an inexpensive plastic material, so that the invention is inexpensive enough to manufacture that it is feasible for use as a disposable trap. The cover 10 in the form of a tubular member has two vertical slots 40 and 42 which are located in a forward portion to allow striker arms 30 and 31 to enter and move toward the lower portion of the tubular member 10 in the case when the rodent passes within the enclosure 14 and trips the trigger pad 50, as described below.

Figure 6:
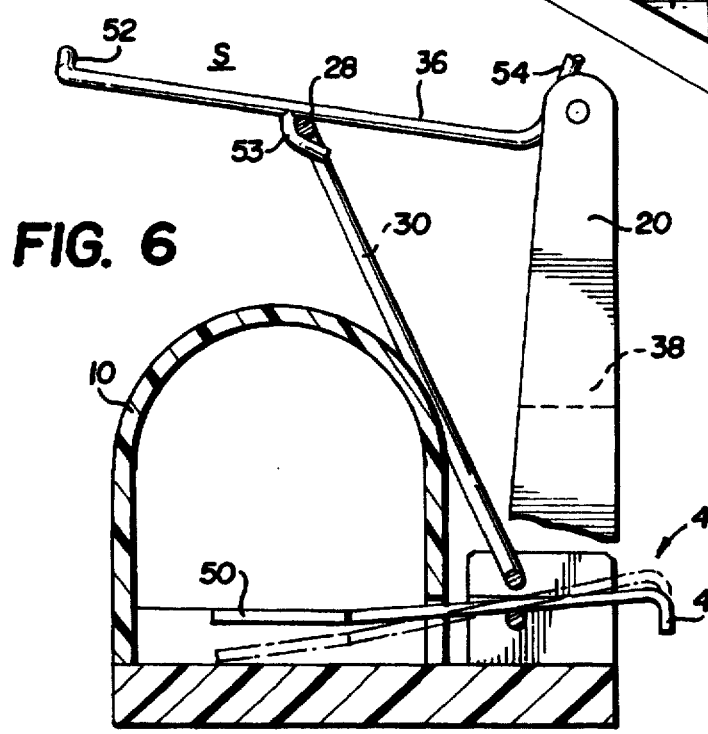
FIG. 6 is a cross-sectional view taken along line 6—6 of FIG. 2, showing a central hook of the cam lever in cooperating with a striker bar of a striker means shown in a set position.

The cam lever 36 is pivotally mounted to the slot 38 of the upright stand 20 to provide a movement $R_2$ (shown by arrow) of the cam lever 36 between a set position S to a catch position C as shown in FIGS. 3 and 6. The extension arm 52 of the cam lever 36 is oriented to be perpendicular to the base 12 and to be parallel to the upright stand 20, when the central portion hook 53 cooperating with the striker bar 28 is in the set position.

The other hook 54 is located in the upper portion of the cam lever 36 for positive engagement with the striker bar 28, when the striker means is in the catch position C and for released engagement with striker bar 28, when the striker means moves along arrow $R_1$ to the sprung or release position T.

The spring 56 for biasing the cam lever 36 is pivotally connected to the first support member 22 and has extension rods 58 and 60, one of which hooks the striker arm 30 of the striker means 18, and the other of which is connected with the base 12.

In operating the device, the striker means 18 is pulled back and engaged with the central portion hook 53 to hold the striker bar 28 of the striker means 18 in set position S when the enclosure 14 is to be inserted into the cover 10. Once the enclosure 14 is inserted, the bait can be placed at the closed end of the bag 14. When this step is completed, the trap is ready to be armed. For this purpose, the striker means 18 is pulled all the way back until the upper slot 55 of the hook 54 of the cam lever 36 engages the striker bar 28. When the striking means 18 attain this position, the rear end 48 of the trigger member 46 seats in the extension arm 52 of the cam lever 36, so that the striker means 18 is retained in its catch position C. In this catch position, the open end 57 of the enclosure 14 is exposed, so that the mouse, upon smelling the bait in the enclosure 14 will enter the mouse trap 5 and move toward the bait at enclosure end 16, thereby passing toward the striker means 18 and touching the pad end 50 of the trigger member 46, which is depressed, disengaging extension arm 52 from trigger member 46 (shown by arrow $R_3$, FIG. 3), thereby releasing cam lever 36 as shown in FIG. 3 (arrow $R_2$) and allowing the spring-loaded striker means 18 to hit the enclosure 14 and the mouse therein through two slots 40 and 42 in the cover 10, as shown in FIG. 3(release position T) and FIG. 2. Striker means 18 are configured so as not to penetrate enclosure 14.

To remove the mouse after a capture, the striker means 18 is pulled back until the central portion hook 53 is engaged so that it holds the striker bar 28 in the set position, and the bag with the mouse may be removed and discarded without the user being exposed to the mouse or to body fluids from the mouse.

Figure 7:
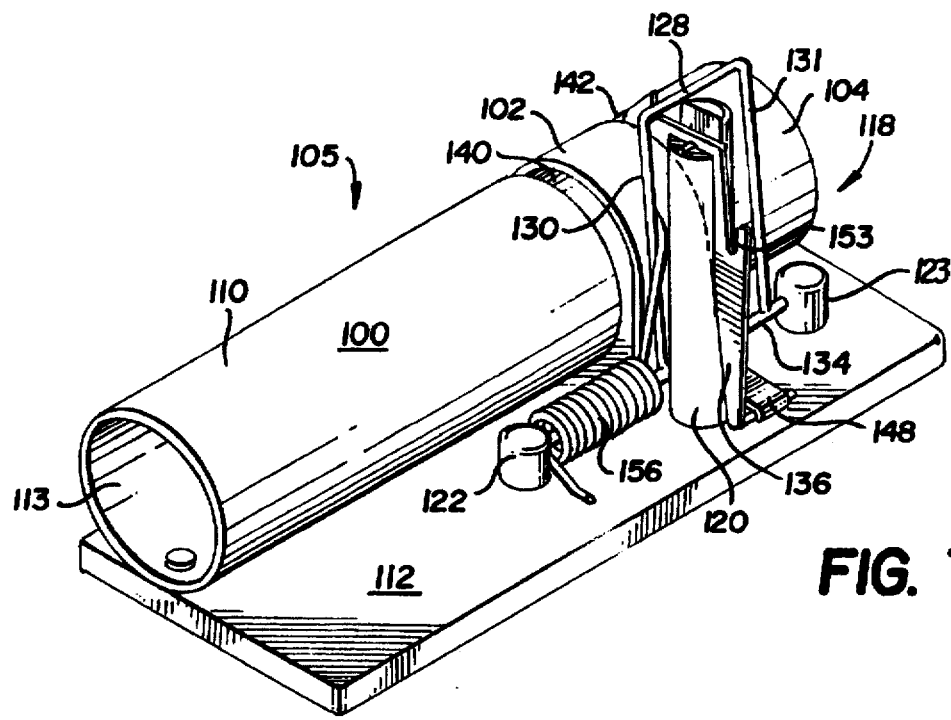
FIG. 7 is a perspective view of a second embodiment of a mouse trap in accordance with the present invention showing a tubular cover.

FIG. 7 illustrates in perspective view a second embodiment of the mouse trap in which like elements are incremented by 100 from the first embodiment, showing the tubular member 110 formed as three separate portions 100, 102 and 104. In this embodiment the central portion of the cover 102 is bonded to the base 112 to protect the inserted bag 14. This central portion 102 section is fish-hook in shape.

Figure 8:
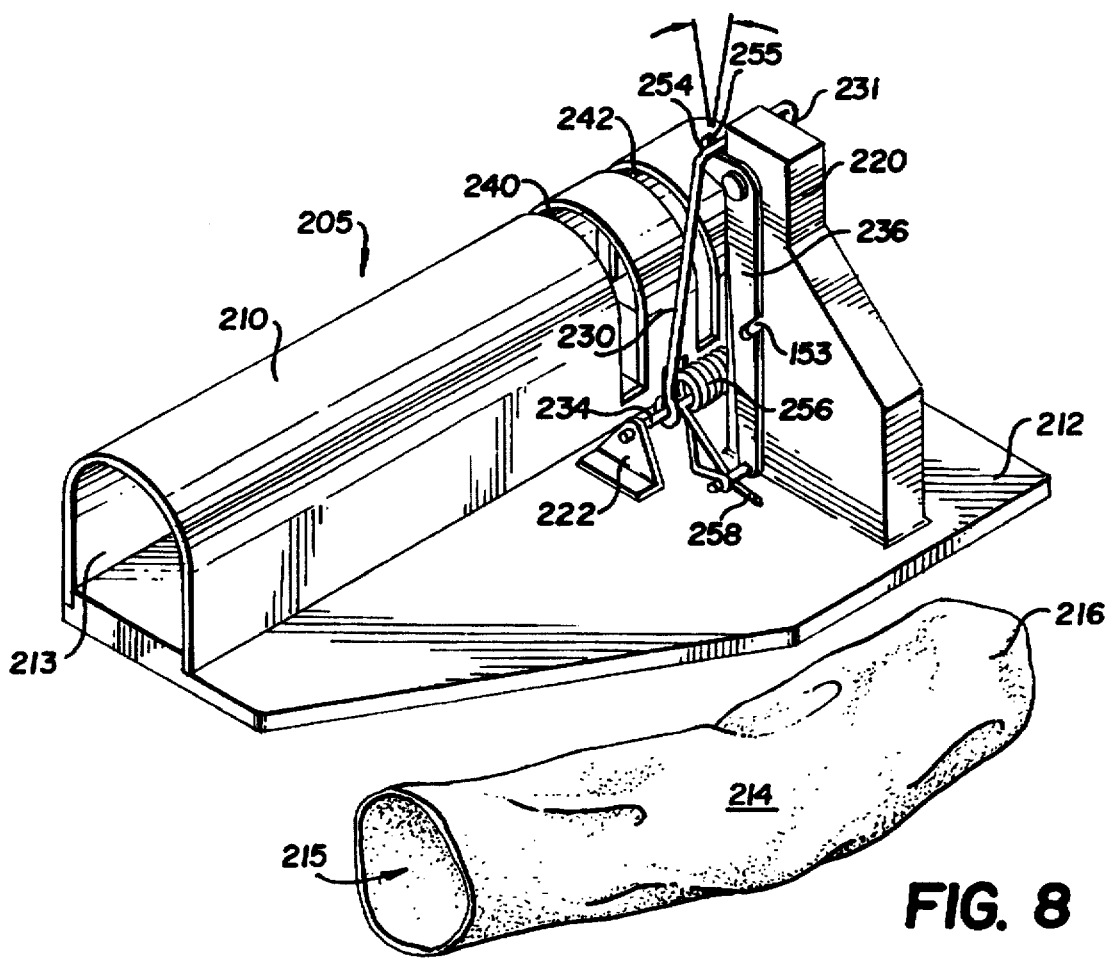
FIG. 8 is a perspective view of a third embodiment of a mouse trap illustrating a spring which is mounted between the striker arms and the housing, with the enclosure to be engaged within the housing shown separately outside of the housing.

FIG. 8 illustrates in a perspective view a third embodiment of the mouse trap, in which like elements are incremented by 200 from the first embodiment. In this third embodiment, the spring 256 for biasing the cam lever 236 is mounted between the striker anus 230 and 231. The enclosure 214 usually made of a flexible material has an extended length at one open end which can be folded over to seal the mouse, before the bag is removed from the trap. It can be also folded back over the end of the cover 210 to secure it more firmly once inserted in cover 210. The striker arms 230 and 231 are pivotally mounted to the ends of the pivot pin 234.

Figure 9:
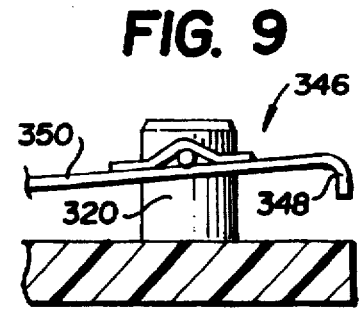
FIG. 9 is a cross-sectional view taken along line 9—9 of FIG. 7, showing an alternate embodiment of the trigger pivot.

The trigger member 346 (FIG. 9) includes the rear end 348 and the pad end 350 which are spotwelded together. The trigger pivot point is raised up to the same pivot point as the striker means. This brings the trigger member up to where it needs to be, and at the same time eliminates having a pivot point for the trigger member different from that of the striker means.

The hook 254 in the lower portion of cam lever 236, is shaped so as to form an upper slot 255 with an inclination to the vertical of the upright stand 220 in the range of from about 10 to 35 degrees (FIG. 8).

The second and third embodiments described herein operate in a fashion similar to the first embodiment of the mouse trap.

A method of killing a rodent in accordance with the present invention includes the steps of trapping the rodent within an enclosure, releasing a triggered striker element and killing the rodent by striking the rodent within the enclosure without penetrating the enclosure.

From the foregoing, it has been shown that an inexpensive mouse trap is provided in accordance with this invention.

Because the trap can be manufactured of a plastic and metal, it will not have an absorbency and stain problem such as the well-known wood traps. It can be set and baited without hurting the user's fingers, because they are always behind the striker means and not over the top of the striker means. The colored plastic bag permits the user to avoid seeing the mouse inside. The cover provided with two slots permits hitting the mouse by two striker arms of the striker means. When the mouse enters on the pad end of the trigger means, he is hit on the head and the body, resulting in an instant kill, without the striker means penetrating the enclosure. The trap can be sized to capture either large or small rodents.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. A trap for mouse or other rodent comprising:

a disposable enclosure for receiving the rodent therein, said disposable enclosure disposed within a tubular member having a pair of spaced transverse slots for receiving a striker bar to engage said disposable enclosure;

a spring-biased striker bar pivotally supported in a base adjacent to said enclosure for killing the rodent in the enclosure, said base including an upright stand, a first support member and a second support member, said striker bar including a pair of interconnected arms which are operatively connected to said first and second support members for pivotal movement between a catch position and a release position; and a sensing element in contact with said disposable enclosure, which when activated by the rodent, automatically causes said striker bar to engage said enclosure and strike said rodent.

2. A sanitary and disposable mousetrap comprising:

a base having an upright stand, a first support member, and a second support member;

a cam lever pivotally mounted on the upright stand for pivotal movement between a set position and a catch position;

a spring-loaded striker means having a striker bar and a pair of arms interconnected through said striker bar, and pivotally mounted on the first and second support members for pivotal movement between a set position, a catch position and a release position;

a spring for biasing said cam lever towards said cam lever catch position and pivotally mounted on said second support member, said spring being configured with a pair of extension rods, one of which has a distal end that hooks around one of said arms and the other extension rod contacts with said base;

a trigger member having a rear end for cooperating with said cam lever and a pad end which is activated by the rodent to be trapped.

3. A method of killing a mouse or other rodent in a trap, comprising the steps of:

trapping the rodent in a disposable, plastic enclosure which is disposed within a hardened tubular member having a pair of transverse slots for receiving a striker bar; and automatically releasing said striker bar so as to pass through said transverse slots, thereby killing the rodent while the rodent is within the enclosure without penetrating said enclosure, and removing and disposing of said enclosure without touching the rodent.

4. A trap for a mouse or other rodent comprising:

a disposable enclosure for receiving the rodent therein, said disposable enclosure disposed within a tubular member having a transverse slot for receiving a striker bar to engage said disposable enclosure;

a spring-biased striker bar mounted on a base, said striker bar being pivotable between a set position, a catch position and a release position, said base including an upright stand, a first support member and a second support member;

said striker bar including a pair of interconnected arms which are operatively connected to said first and second support members for pivotal movement between a set position, a catch position and a release position;

a sensing element in contact with said disposable enclosure, which when activated by the rodent, automatically causes said striker bar to engage said enclosure and strike said rodent; and a cam lever, an upper end of which is supported by said upright stand, said cam lever being pivotable between said set position, catch position and release position and includes a perpendicular arm in a top portion thereof for engaging a rear end of the sensing element, said cam lever further including a pair of hooks, one of which is located in a central portion of said cam lever for cooperation with said striker bar when said striker bar is in the set position, and the other hook is located in a lower portion of said cam lever for releasable engagement with said striker bar when said striker bar is in the catch position.

5. A trap for a mouse or other rodent as recited in claim 4, wherein the hook of said cam lever in a lower portion is shaped so as to form an upper slot with an inclination to the vertical of said upright stand in the range of from about 2 to 10 degrees.

* * * * *